United States Patent [19]
Shao et al.

[11] Patent Number: 5,878,096
[45] Date of Patent: Mar. 2, 1999

[54] DIGITAL FILTER HAVING PHASE-ADJUSTMENT ABILITY

[75] Inventors: Hsuan Ming Shao; Yi Ren Chen, both of Hsin Chu, Taiwan

[73] Assignee: Holtek Microelectronics Inc., Hsin Chu, Taiwan

[21] Appl. No.: 826,066

[22] Filed: Mar. 24, 1997

[51] Int. Cl.⁶ .................................................. H04L 7/00
[52] U.S. Cl. .......................................... 375/371; 375/350
[58] Field of Search ...................... 327/90, 98, 276–278, 327/284, 403; 375/340, 371, 350; 329/303, 307, 360

[56] References Cited

U.S. PATENT DOCUMENTS

| | | | |
|---|---|---|---|
| 3,617,717 | 11/1971 | Smith | 235/151.1 |
| 3,806,918 | 4/1974 | Cauthron et al. | 375/327 |
| 4,339,184 | 7/1982 | Bagdis | 327/42 |
| 4,644,566 | 2/1987 | Vercellotti et al. | 375/340 |
| 5,666,079 | 9/1997 | Ma | 327/276 |

*Primary Examiner*—Stephen Chin
*Assistant Examiner*—Joseph Roundtree
*Attorney, Agent, or Firm*—Bacon & Thomas, PLLC

[57] ABSTRACT

Disclosed is a digital filter having phase-adjustment ability, and more particularly to a digital filter system which can restore the phase of data transmitted via digital radio communication and thereby enhances the noise-immunity of data and the correct bit decision. The digital filter mainly includes a hold back data unit, a digital filter unit, and a signal phase modify unit to remove noises in the signals and to modify and restore correct digital wave-form signals. The digital filter having phase-adjustment ability is suitable for use in digital radio phones, pagers, etc. commonly found in the radio communication systems.

3 Claims, 6 Drawing Sheets

Signal Phase Modify unit

DIGITAL FILTER HAVING PHASE-ADJUSTMENT ABILITY

BACKGROUND OF THE INVENTION

1. Field of the Invention

The present invention relates to a digital filter having phase-adjustment ability, and more particularly to a digital filter system which can restore the phase of data transmitted via digital radio communication and thereby enhances the noise-immunity of data and the correct bit decision.

2. Description of the Prior Art

Living in this modern society featured with highly developed information science, people face the necessity of exchanging information with others everyday. The way of transmitting information becomes more and more important. It has become very popular for people to use digital radio signals in their remote and non-face-to-face communication.

High-frequency signals received by a receiver of a digital radio communication equipment are demodulated. The resulting digital signals are usually distorted by external noises combined with the signals. Therefore, a digital filter is required to filter out such noises so that a modified and correct wave form of the received digital signals can be obtained to allow completely correct decision of data based on the received signals. Most conventional digital wave filters are so designed that their sampling frequency and count sampling point will cause the following drawbacks:

1. Data obtained from the filtered signals shall have inconsistant lengths, that is, the wave forms of high level 1 and low level 0 are uneven. Therefore, it is possible that an incorrect signal is read during data decision.

2. In addition, since it is not easy to decide whether a wave form is really delayed, temporarily delayed, or simply incorrectly read due to too many noises, it is usually to process the phase adjustment after wave filtering with complicated logical procedures through multi-level state control, such as an IF-THEN statement. However, in view of the responding speed of such phase adjustment, it is possible to have a response that is too slow.

It is therefore the inventor has developed a means to eliminate the above-mentioned drawbacks existed in the conventional digital filter systems.

SUMMARY OF THE INVENTION

A primary object of the present invention is to provide a digital filter having phase-adjustment ability which uses a group of registers to aquire data and then to proceed up or down limit counting decision, so as to enhance the noise-immunity of data while increasing the correctness of bit decision, and therefore provide better signal receiving effect than the conventional digital filters.

Another object of the present invention is to provide a digital filter having phase-adjustment ability which has an Adjust Logic Implement serving as a control center. Whereby, coarse and fine adjustments can be made in response to the actual condition of a received pulse at the Preamble stage and the Lock stage, allowing adjustments to be made at any time according to the changes in signals.

BRIEF DESCRIPTION OF THE DRAWINGS

The detailed structure, the applied principles, the function and the effect of the present invention can be best understood by referring to the following detailed description of the preferred embodiment and the accompanying drawings, wherein.

DETAILED DESCRIPTION OF THE PREFERRED EMBODIMENT

Figure 1:
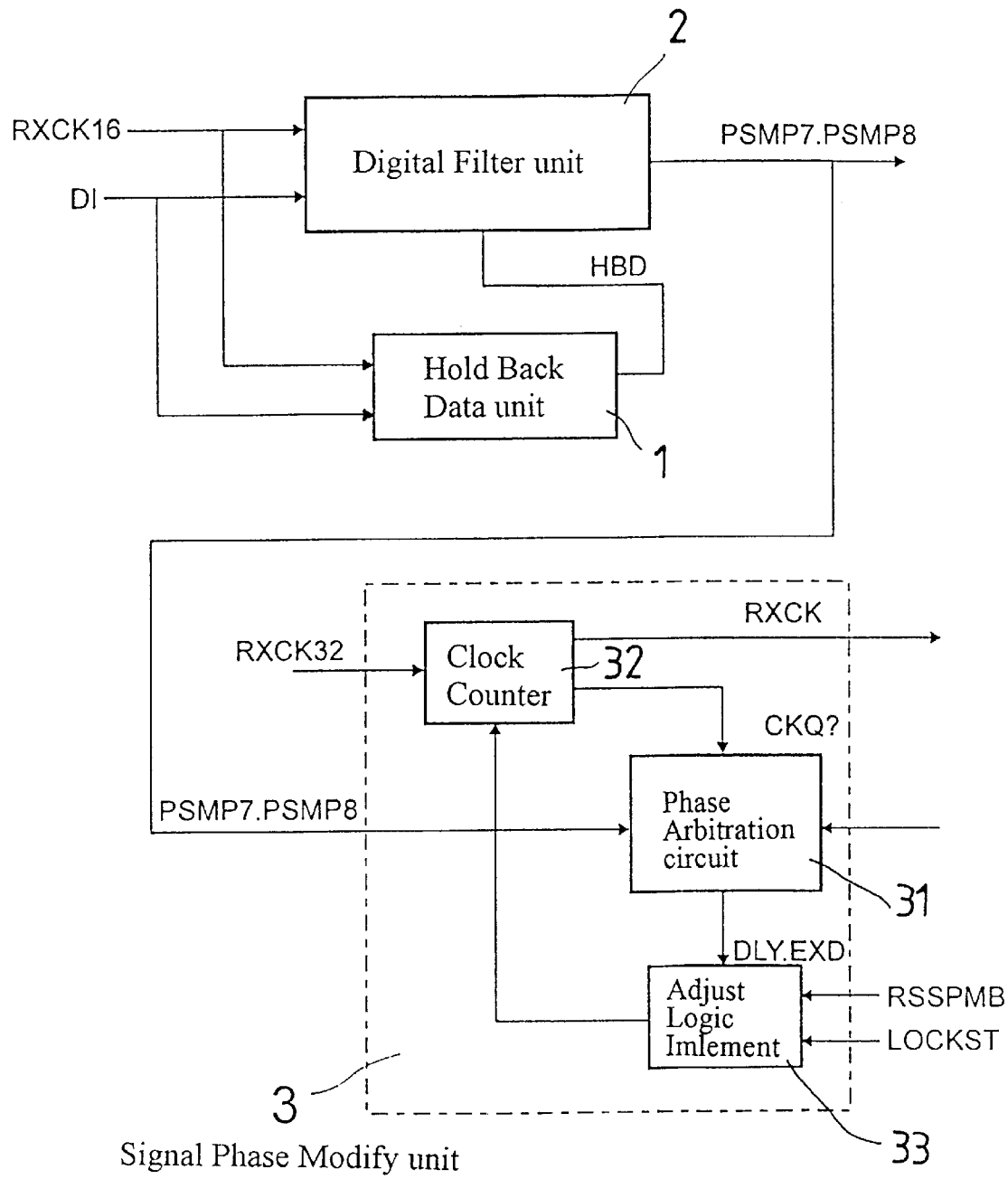
FIG. 1 is a block diagram showing the modules of the digital filter having phase-adjustment ability according to the present invention.

Please refer to FIG. 1 which is a block diagram of modules of the digital filter having phase-adjustment ability of the present invention. From the drawing, it can be seen that the present invention includes a Hold Back Data unit 1, a Digital Filter unit 2, and a Signal Phase Modify unit 3.

The Hold Back Data unit 1 holds back a received and demodulated Data In signal (DI) and inputs a 16 times frequency clock signal (RXCK16), and then outputs a Hold Back Data signal (HBD) to the Digital Filter unit 2 for wave filtering. Being driven by the 16 times frequency clock signal (RXCK16), the Digital Filter unit 2 follows the 16 times frequency it receives to proceed a similar times of equalization analysis against the signal sent from the Hold Back Data unit 1 and filters out the noises, generating digital data signals (PSMP7) and (PSMP8). Digital data signal (PSMP8) has a wave form being delayed for one clock than that of the digital data signal (PSMP7). After the noises are filtered out, the two digital data signals (PSMP7) and (PSMP8) with complete data are sent to the Signal Phase Modify unit 3 for modification. The Signal Phase Modify unit 3 includes a Phase Arbitration circuit 31 for judging the phase and a Clock Counter 32 connected to the Phase Arbitration circuit 31. The Clock Counter 32 inputs a 32 times frequency pulse (RXCK32) and is driven by the same. When the clock counter 32 has a count value of zero (0), it outputs a Read Enable Clock (RXCK). The Phase Arbitration circuit 31 conducts an exclusive OR logical operation (XOR) on the wave forms of the two digital data signals (PSMP7) and (PSMP8) to obtain a signal data edge. The signal data edge is then compared with the clock count value by the Phase Arbitration circuit 31 to decide whether the Read Enable Clock (RXCK) is delayed (DLY) or exceeded (EXD). A message about the delay (DLY) or exceed (EXD) Read Enable Clock is sent to an Adjust Logic Implement 33 (ALI). The Adjust Logic Implement (ALI) 33 shall issue an adjusting signal to the clock counter 32 according to the delay or exceed signal, so as to adjust or control the speed of the clock counter 32, causing the Read Enable Clock (RXCK) output by the clock counter 32 to have a phase maintained in the middle of the wave form of signals (PSMP8) with complete digital data. Whereby, a more accurate bit data signal can be obtained.

Figure 2:
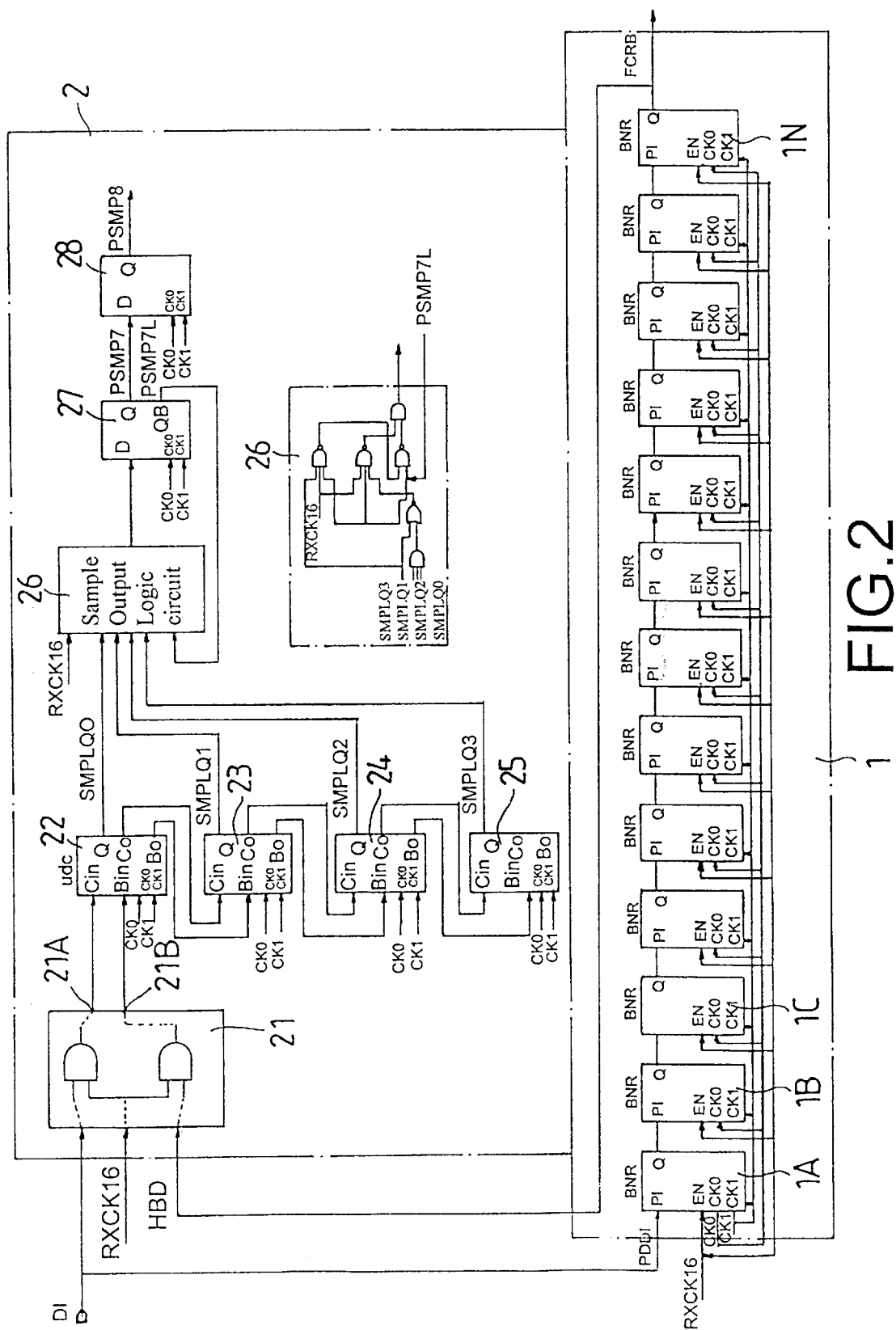
FIG. 2 is a logic circuit diagram of the Hold Back Data unit and the Digital Filter unit of the digital filter having phase-adjustment ability according to the present invention.

FIG. 2 is a logic circuit diagram of the Hold Back Data unit 1 and the Digital Filter unit 2 of the digital filter having phase-adjustment ability according to the present invention. The Hold Back Data unit 1 includes a plurality of series-connected registers 1A, 1B, 1C, . . . , 1N. Wherein, the first register 1A has a data input end (PI) electrically connected to the demodulated data in signal (DI) while the other registers 1B, 1C, . . . , 1N respectively have a data input end (PI) electrically connected to a Data Output end (Q) of a preceding register. The last register IN has a Data Output end (Q) which allows data to be sent to the Digital Filter Unit 2. The registers 1A, 1B, 1C, . . . , 1N all have an Enable Input end (EN) connected to a 16 times frequency clock signal (RXCK16). From the data output end (Q) of the last register 1N, held and delayed hold back data signal (HBD) are supplied to the Digital Filter unit 2. The Digital Filter unit 2 includes a threshold frequency counter 21, several cascade-connected half adders 22, 23, 24, and 25, a Sample Output Logic circuit 26, and a first and a second flip-flop 27, 28. Following is a Truth Table showing the truth values generated by pins when the cascade-connected half adders 22, 23, 24, and 25 function:

| Cin | Qn | Co | Qn + 1 |
|---|---|---|---|
| 0 | 0 | 0 | 0 |
| 0 | 1 | 0 | 1 |
| 1 | 0 | 0 | 1 |
| 1 | 1 | 1 | 0 |

Note:
Qn represents the Nth signal output from the pins at Q. And, Qn + 1 represents the N + 1st signal output from the pins at Q.

The threshold frequency counter 21 inputs at its input end a 16 times frequency clock signal (RXCK16), a data input signal (DI), and a held and delayed Hold Back Data signal (HBD). The threshold frequency counter 21 has a forward or up output end 21A connected to pins of a forward dr up input end (Cin) of the first cascade half adder 22, and a backward or down output end 21B connected to pins of a backward or down input end (Bin) of the first cascade half adder 22. At here, the threshold frequency counter 21 is driven by the 16 times frequency signal (RXCK16) to decide whether a forward (up) or a backward (down) count should be done against the demodulated Data Input signal (DI) and the Hold Back Data signal (HBD). Then, a forward (up) or a backward (down) count signal is output to the first cascade half adder 22. The first cascade half adder 22 and the other cascade half adders 23, 24, and 25 compare the input signal to decide the sample signal SMPLQ? (SMPLQ0–SMPLQ3) at the output end (Q) of each these half adders. A forward (up) or a backward (down) count is then output through the sample signal (SMPLQ). The cascade half adders 22, 23, 24, and 25 each has a forward (up) count output end (Co) connected to a forward (up) count input end (Cin) of a next cascade half adder, and a backward (down) count output end (Bo) connected to a backward (down) count input end (Bin) of the next cascade half adder. The last cascade half adder 25 has a backward (down) output end (Bo) left unused. All the output ends (Q) of these half adders 22, 23, 24, and 25 are electrically connected to the Sample Output Logic circuit 26, so that signal about the cascade of sample signals (SMPLQ) output by these half adders 22, 23, 24, and 25 are sent via the Sample Output Logic circuit 26 to generate digital data signals (PSMP7) and (PSMP8). When the forward (up) count input end (Cin) of the half adder 22 has a high potential, the cascade of sample signals SMPLQ0 through SMPLQ3 is counted forward from 0000, 0001, 0010, etc. On the other hand, when the backward (down) input end (Bin) of the half adder 22 has a high potential, the cascade of sample signals SMPLQ0 through SMPLQ3 is counted backward from 0111, 0110, 0101, etc. Following is a Table showing all the possible signals:

| Data Input signal (DI) | HBD | Cin | Bin | SMPLQ |
|---|---|---|---|---|
| 1 | 0 | 1 | 0 | forward count |
| 0 | 1 | 0 | 1 | backward count |
| 0 | 0 | 0 | 0 | SMPLQ unchanged |
| 1 | 1 | 1 or | 1 | not decided |

In the fourth state shown in the above table, there are two possible sample signals (SMPLQ). If both the Data Input signal (DI) and the Hold Back Data signal (HBD) are 1 and if there is only one clock (CLK), the sample signal (SMPLQ) is changed depending on a value of the sample signal (SMPLQ0) output by the first cascade half adder 22. When the sample signal (SMPLQ0) is 0, a backward (down) count is done. And, when the sample signal (SMPLQ0) is 1, a forward (up) count is done. If the 4th state of both Data Input signal (DI) and of the Hold Back Data signal (HBD) is 1 and continues for more than one clock (CLK), the sample signal SMPLQ will be forward (up) counted for one clock (CLK) and backward (down) counted for one clock (CLK) alternately, so that the value of SMPLQ adds 1 and deducts 1 alternately.

The signal values for sample signals SMPLQ0–SMPLQ4 are electrically connected to an input side of the Sample Output Logic circuit 26. An output end of the Sample Output Logic circuit 26 is electrically connected to an input end (D) of the first flip-flop 27. A feedback signal (PSMP7L) is generated at a backward output end (Q) of the first flip-flop 27. The feedback signal (PSMP7L) is fedback to the input side of the Sample Output Logic circuit 26. A digital data signal PSMP7 is generated at a forward output end (Q) of the first flip-flop 27. The digital data signal PSMP7 is sent to an input end (D) of the second flip-flop 28. A digital data signal (PSMP8) is generated at an output end (Q) of the second flip-flop 28. The purpose for such a arrangement is to let the digital data signal PSMP7 lead the digital data signal PSMP8 by one clock, so that subsequent circuits may use the digital data signal PSMP7 to generate an Edge signal and uses the value of the sample signal SMPQ? as a basis to output a filtered digital data signal PSMP8. Following are the bases for determination of the output of PSMP8:

When the SMPLQ? is forward (up) counted up to 8, the PSMP8 output is high; and when the SMPLQ? is backward (down) counted to 6, the PSMP8 output is low.

The Sample Output Logic circuit 26 inputs the sample signal (SMPLQ) count value which together with the fedback feedback signal PSMP7L are used by the Sample Output Logic circuit 26 to judge whether the data output should be high or low to effectuate the above bases of determination. When the signal (PSMP7) is delayed by one cascade (or one clock), the signal output shall be the true filtered digital data signal PSMP8. Therefore, in the present invention, after the sample signals are sampled by means of a 16 times frequency, and if it is found that more than ½ (or 8/16) of one bit data is 1, the bit shall be considered as 1. Otherwise, the bit is considered as 0. With this principle, the signals are screened and filtered.

Figure 3:
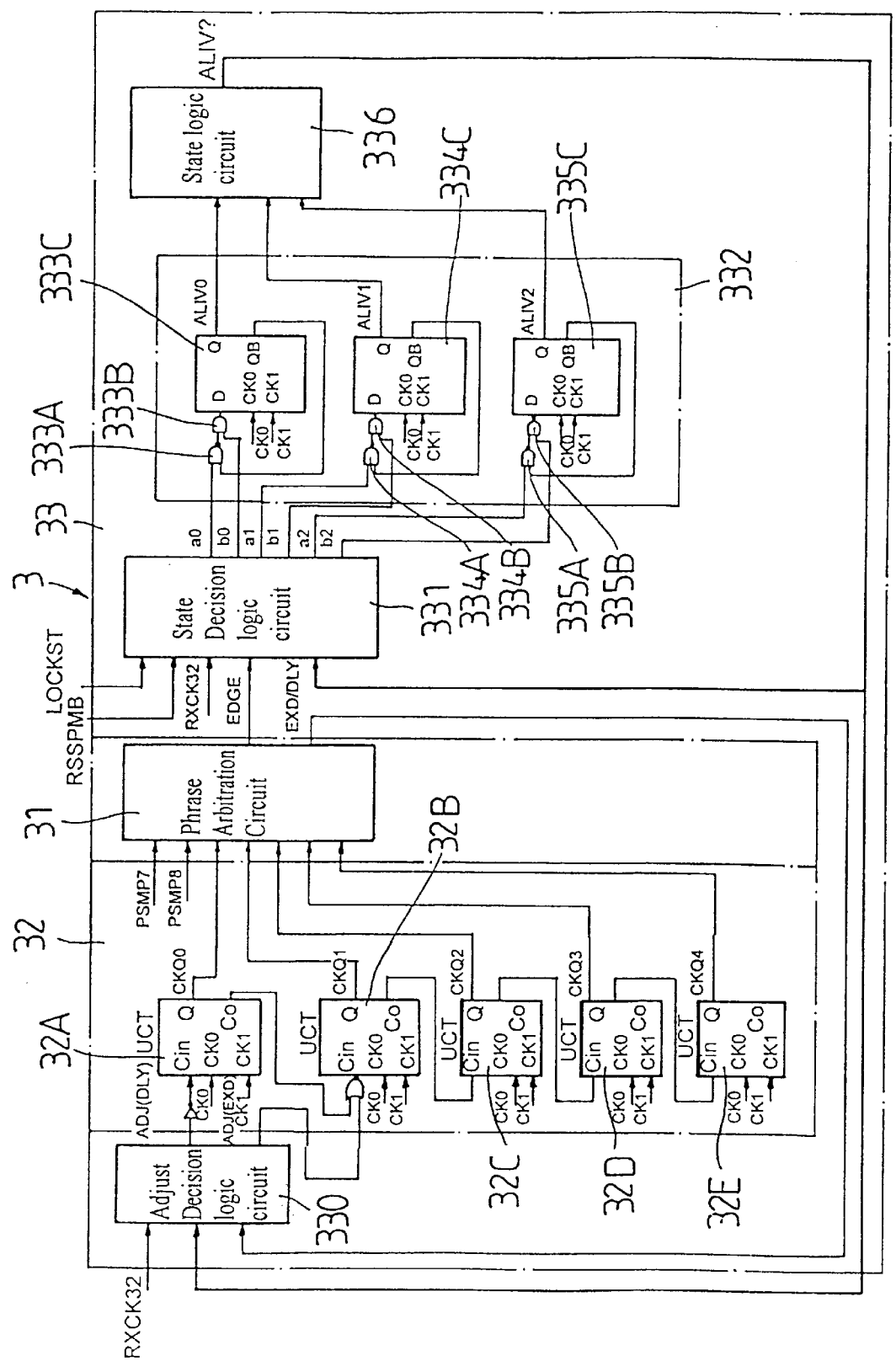
FIG. 3 is a logic circuit diagram of the Signal Phase Modify unit of the digital filter having phase-adjustment ability according to the present invention.

The filtered digital data signals (PSMP7) and (PSMP8) are sent to the Signal Phase Modify unit 3 for further process. FIG. 3 is a logic circuit diagram of the Signal Phase Modify unit 3. As shown in FIG. 3, the Signal Phase Modify unit 3 includes a Phase Arbitration circuit 31, a clock counter 32, and an Adjust Logic Implement 33.

Figure 4:
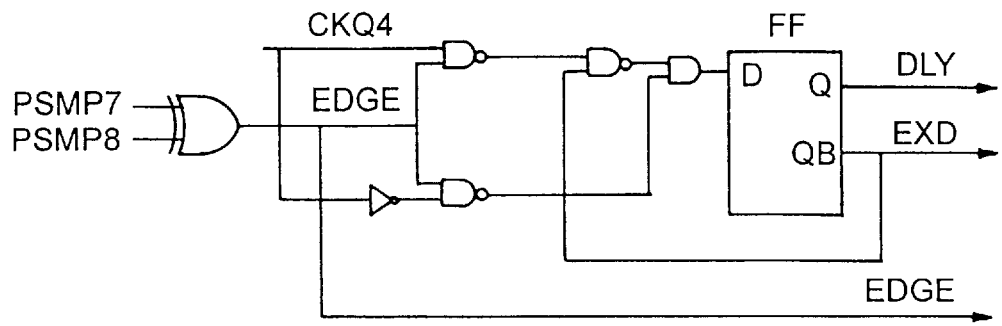
FIGS. 4, 5, 6 and 7 are logic circuit diagrams showing some detailed circuits of FIG. 3.

The Phase Arbitration circuit 31 has an input side at where digital signals (PSMP7) and (PSMP8) are input for an exclusive OR (XOR) logical operation to obtain a signal data edge. To the input side of the Phase Arbitration circuit 31, count values (CKQ0–CKQ4) having been processed by the clock counter 32 are connected. Please refer to FIG. 4 for a detailed logic circuit of the Phase Arbitration circuit 31. The clock counter 32 includes more than one cascade-connected adders 32A, 32B, 32C, . . . , and 32E. Following is a Truth Table showing the truth values generated by pins when the cascade-connected adders 32A, 32B, 32C, . . . , and 32E function:

| Cin | Bin | Qn | Qn | Qn + 1 | Bo | Co |
|-----|-----|-----|-----|--------|-----|-----|
| 0 | 0 | 0 | 1 | 0 | 0 | 0 |
| 0 | 0 | 1 | 0 | 1 | 0 | 0 |
| 0 | 1 | 0 | 1 | 1 | 1 | 0 |
| 0 | 1 | 1 | 0 | 0 | 0 | 0 |
| 0 | 0 | 0 | 1 | 0 | 0 | 0 |
| 0 | 0 | 1 | 0 | 1 | 0 | 0 |
| 1 | 0 | 0 | 1 | 1 | 0 | 0 |
| 1 | 0 | 1 | 0 | 0 | 0 | 1 |

Adders 32A, 32B, 32C, . . . and 32E all have a carry output end (Co) connected to an input end (Cin) of a lower cascade adder. The carry output end (Co) of the last cascade adder 32E is left unused. When the clock counter 32 is driven by a 32 times frequency clock signal (RXCK32) to generate count values (CKQ0–CKQ4) at the output ends (Q) of adders, these count values (CKQ0–CKQ4) are sent to the input side of the Phase Arbitration circuit 31, so that the Phase Arbitration circuit 31 can compare the signal data edge with the count values (CKQ0–CKQ4) and decides whether the Read Enable Clock (RXCK) output by the Phase Arbitration circuit 31 is delayed or exceeded. The delay or exceed signal is then sent to the Adjust Logic Implement 33 (ALI) for process. In deciding the delay or exceed of the Read Enable Clock (RXCK) by the Phase Arbitration circuit 31, a signal data edge falling in a range of CKQ<16 is considered as being exceeded and an exceed signal (EXD) of 1 is issued. On the other hand, a signal data edge falling in a range of CKQ>16 is considered as being delayed and a delaysignal (DLY) of 1 is issued. When the count value is 0, a Read Enable Clock (RXCK) is output.

Figure 5:
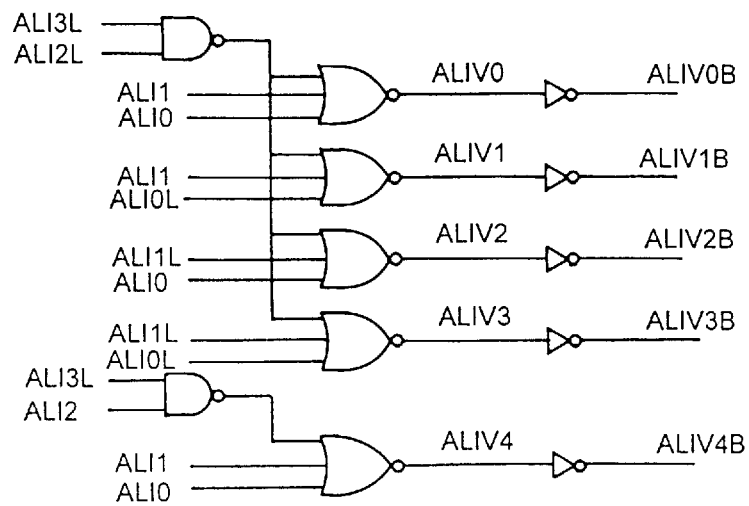
Figure 6:
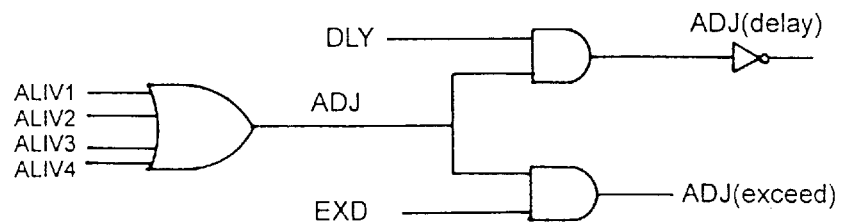
Figure 7:
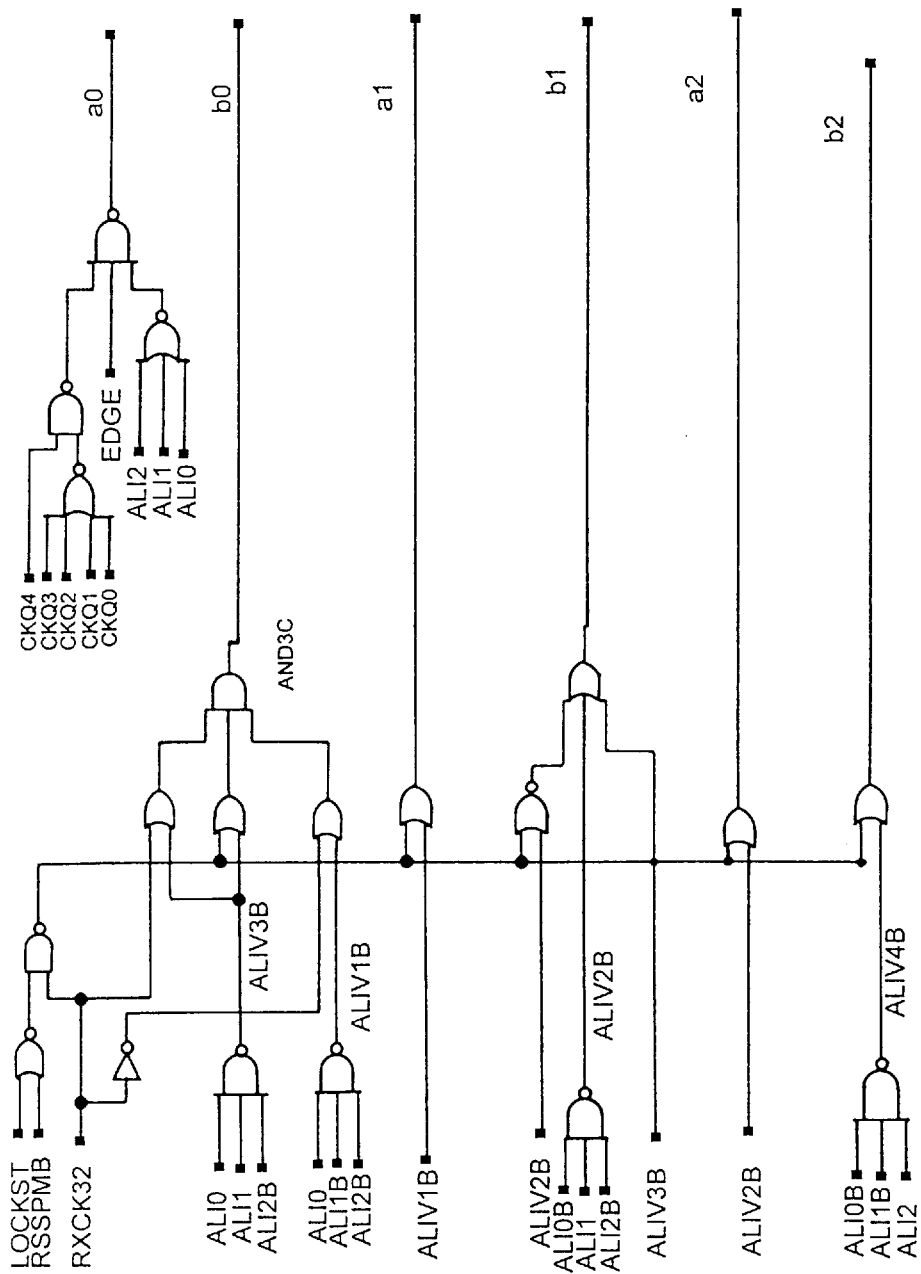

The Adjust Logic Implement (ALI) 33 includes an Adjust Decision logic circuit 330, a State Decision logic circuit 331, an Adjust State Logic Implement 332, and a State logic circuit 336. Please refer to FIGS. 5, 6 and 7 for the detailed logic circuits of the Adjust Decision logic circuit 330, the State Decision logic circuit 331, and the State logic circuit 336, respectively.

The State Decision logic circuit 331 has an input side at where edge signals (EDGE), 32 times frequency clock signals (RXCK32), a Reserve State Preamble signal (RSSPMB), a Lock State signal (LOCKST), and an Adjust Cascade signal (ALIV?) fedback by the State logic circuit 336 are input. The State Decision logic circuit 331 has several pairs of output ends a0, b0; a1, b1; and a2, b2 connected to the Adjust State Logic Implement 332. Details about connections of these outputs shall be described later.

The Reserve State Preamble signal (RSSPMB) is to indicate every message paragraphs have received a correct preamble and obtain a synchronous transmission. The Lock State signal (LOCKST) indicates a frequency of transmitted data has been locked and the data can be correctly received. Thus, when the Reserve State Preamble signal (RSSPMB) or the Lock State signal (LOCKST) has a high potential value of 1, it means the phase has been properly adjusted or has only a little offset and needs only a fine adjustment. If both the Reserve State Preamble signal (RSSPMB) and the Lock State signal (LOCKST) do not have a high potential value of 1, it indicates there is a considerably big phase offset and a coarse adjustment is required. Thus, when the State Decision logic circuit 331 is driven by a 32 times frequency clock signal (RXCK32), a basis for outputing a coarse or a fine adjustment can be obtained. With this adjustment basis and the edge signal (EDGE) as well as the 32 times frequency clock signal, control signals are issued from the several pairs of output ends a0, b0; a1, b1; and a2, b2 to the subsequent Adjust State Logic Implement 332.

The Adjust State Logic Implement 332 includes a three-cascade NAND gates 333A, 334A, 335A connected to three AND gates 333B, 334B, 335B which are further connected to three flip-flop 333C, 334C, 335C, so as to issue three-cascade signals (ALIV0), (ALIV1), and (ALIV2) to the State logic circuit 336. The first cascade is connected to the output end pair a0, b0; the second cascade is connected to the output end pair a1, b1; and the third cascade is connected to the output end pair a2, b2. Since all these three cascades are similarly constructed, only the first cascade is described herein.

The first-cascade NAND gate 333A has a first input end connected to the output end a (more particularly, a0 for the first cascade) and a second input end connected to a back-ward output end (QB) of the flip-flop 333C in the same cascade. The first-cascade NAND gate 333A has an output end connected to a first input end of the AND gate 333B in the same cascade. A second input end of the AND gate 333B is connected to the output end b (more particularly, b0 for the first cascade). The AND gate 333B has an output end connected to an input end (D) of the flip-flop 333C in the same cascade. An output end (Q) of the flip-flop 333C is connected to the State logic circuit 336, so that an Adjust State signal (ALVI0) is issued to the State logic circuit 336 as an adjustment and control means. Following is a Truth Table showing the truth values generated in one single cascade:

| a | b | q |
|---|---|---|
| 0 | 0 | 0 |
| 0 | 1 | 1 |
| 1 | 0 | 0 |
| 1 | 1 | Q (unchanged) |

The three cascade signals (ALIV0, ALIV1, ALIV2) connected to the input side of the State logic circuit 336 are three-cascade binary signals and are converted into complete decimal adjust state signals (ALIV?) by the logic circuit in the State logic circuit 336. The State logic circuit 336 has an output side connected back to the Adjust Decision logic circuit 330 and to an input end of the State Decision logic circuit 331, forming a complete feedback control loop.

Figure 8:
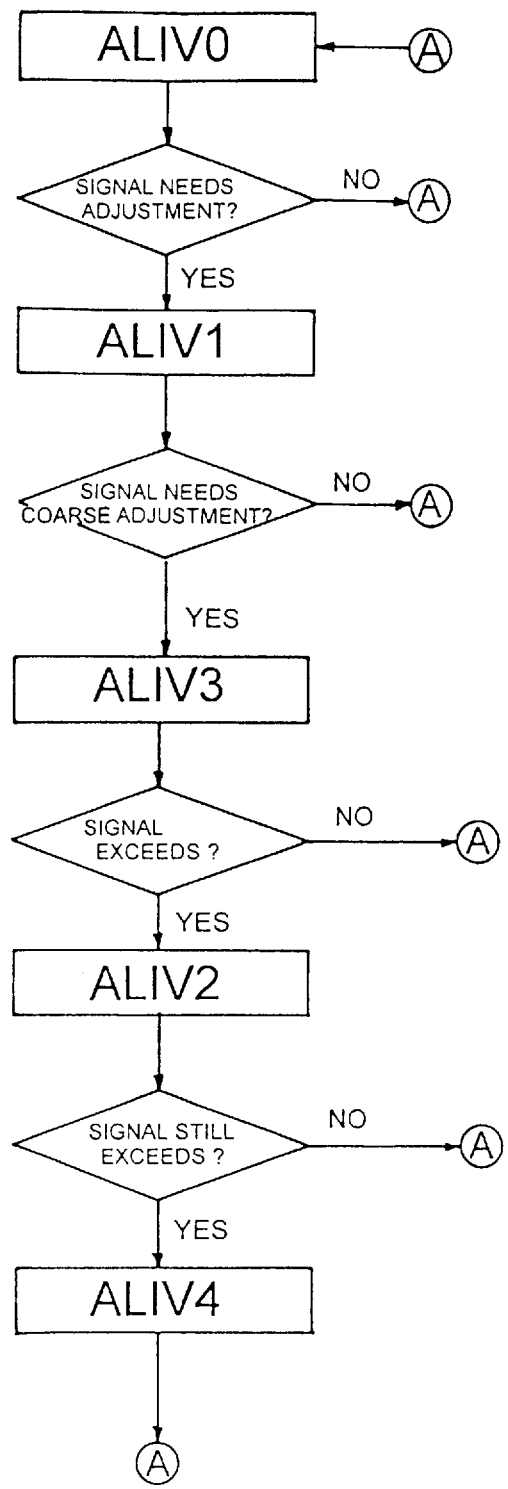
FIG. 8 is a flow chart showing the possible actions taken by the Adjust Logic Implement (ALI) of FIG. 3.

After being processed as above mentioned, all the exceed/delay signals (EXD/DLY) and the Adjust State trigger signals (ALIV?) are sent back to the Adjust Decision logic circuit 330 for a second time adjustment. An exceed (EXD) and delay (DLY) output end is formed at an output side of the Adjust Decision logic circuit 330 to connect to the clock counter 32. Whereby, the EXD/DLY signal and an output signal of the Adjust State trigger signal (ALIV?) drive the clock counter 32 to effect control signals for counting a few more times or counting fewer times than the count value (CKQ). When the adjust delay signal is in a high signal state, a LOW signal is issued to the count value (CKQ0), and the input end (Cin) of the first-cascade adder 32A which generates the above-mentioned count value signal (CKQ0) shall have a signal of 0, and the count value (CKQ) increases relatively by 1. If the adjust delay signal continues for 4 pulses, the count value (CKQ) increases relatively by 4. On the other hand, when the adjust exceed signal is in a high signal state, the input end (Cin) of the second-cascade adder 32B which generates the above-mentioned count value (CKQ1) shall have a signal of 1, and the count value (CKQ?) starts counting from CKQ1. That is, the count value (CKQ?) reduces relatively by 1. Similarly, when the adjust exceed signal continues for several pulses, the count value (CKQ) reduces relatively by the same number of pulses. FIG. 8 is a flow chart showing possible changes in the movements of the Adjust Logic Implement. The above-mentioned relation between the ALIV? signals and the count values (CKQ?) can be clearly seen from FIG. 8. Following table is a summary of this relationship:

| ALI | | CKQ? |
|---|---|---|
| Fine adjustment: | Exceed | Reduce count by 1 |
| | Delay | Increase count by 1 |
| Coarse adjustment: | Exceed | Reduce count by 2–4 |
| | Delay | Increase count by 4 |

As mentioned above, the count value (CKQ) forms from five cascade adders 32A, 32B, 32C, 32D, and 32E. In addition to function like a flip-flop, these gates also have carry function at the carry output end (Co) of the adders. Therefore, these five cascade-connected adders 32A, 32B, 32C, 32D, and 32E may produce binary message from 00000 to 11111 or total 32 decimal numeric values from 0 to 31.

From the above description, it can be seen that the digital filter having phase-adjustment ability according to the present invention may effectively enhance the noise-immunity in the digital radio communication and the accuracy in bit decision at the same time. The present invention can also make coarse or fine adjustments of pulses at the preamble and the lock stages in response to the actual receiving conditions, so that adjustments can be made at any time in response to changes in the signals. The digital filter of the present invention is therefore functionally more accurate than the conventional ones.

Although the present invention has been described with the preferred embodiments thereof, it should be noted that the present invention is not limited to such embodiments and various changes can be made without departing from the spirit of the present invention or the scope of the subjoined claims.

What is claimed is:

1. A digital filter having phase-adjustment ability, comprising:

a hold back data unit including a group of series-connected registers; a first of said registers having a data input end for receiving data input signals, and others of said registers each having a data input end connected to a data output end of a preceding register; each of said registers having an enable input end which inputs a clock signal having a frequency more than eight times a frequency of said data input signals; a last one of these registers having a data output end from where a hold back data signal is output;

a digital filter unit connected to said data output end of said last register of said hold back data unit, said digital filter unit comprising:

a threshold frequency counter which has an input end for inputting a data input signal and a hold back data signal for an up or down count decision and then outputting an up or a down count signal;

several cascade half adders, wherein a half adder thereof at a first cascade has an up input end for receiving said up count signal and a down input end for receiving said down count signal, and other half adders at a second and subsequent cascades all have an up input end connected to an up output end of a preceding half adder and a down input end connected to a down output end of a preceding half adder with said up and said down output ends of a last half adder of said cascade half adders left unused, and a sample signal of each said cascade is output from said output end of each said half adder of said cascade;

a sample output logic circuit having an input side for receiving sample signals output by said cascade half adders and a feedback signal to generate and output logic decision signals;

a first flip-flop having an input end for receiving said logic decision signals output by said sample output logic circuit, so that a digital data signal is output from a forward output end of said first flip-flop, and a feedback signal is generated by a backward output end of said first flip-flop and sent back to said sample output logic circuit; and a second flip-flop having an input end connected to said forward output end of said first flip-flop, so that said second flip-flop generates and outputs a digital data signal having a delay of one clock cycle relative to than said digital data signal output by said first flip-flop; and a signal phase modify unit connected to said digital filter unit for restoring a correct phase of said data signals.

2. A digital filter having phase-adjustment ability as claimed in claim 1, wherein said signal phase modify unit comprises:

a clock counter including several cascade-connected adders, said cascade adders all having a carry output end connected to an input end of a next cascade adder, and said clock counter outputting a group of clock count value signals;

a phase arbitration circuit which compares clock count values produced by said clock counter with said digital data signals generated by said first and said second flip-flop and then outputs an edge signal for said digital data signals and a read enable clock delay or exceed state signal; and an adjust logic implement which is a logic circuit to process said clock count value signals, said edge signal for said digital data signals, said read enable clock delay or exceed state signal, and a lock state signal sent thereto, so as to generate multiple cascade fine or coarse adjustment feedback signals to modify and restore the phase of said data signals received by said digital filter.

3. A digital filter having phase-adjustment ability as claimed in claim 2, wherein said adjust logic implement further comprising:

a state decision logic circuit having an input side for inputting an X times frequency clock signal, digital data signals, and a lock state signal, as well as said edge signal output by said phase arbitration circuit, said state decision logic circuit making logic decision and outputting several pairs of output signals;

an adjust state logic implement including several cascade-connected flip-flop and logic gates, each of said cascade flip-flop having an input end connected to an OR gate and an NAND gate and then connected to one pair of output signals having been logically decided and output by said state decision logic circuit; each of said cascade flip-flop having a forward output end for outputting an adjust state signal for the same cascade, and a backward output end for outputting a feedback signal to said input end thereof;

a state logic circuit having an input side connected to said adjust state signals output by said several cascade flip-flop; said state logic circuit making logic decision on said input adjust state signals and then generating at an output end an adjust state trigger signal which is sent back to said input side of said state decision logic circuit; and an adjust decision logic circuit having an input side to input an X times frequency clock signal, an adjust state trigger signal, and said read enabale clock delay or exceed state signal output by said phase arbitration circuit; said adjust decision logic circuit adjusting all these input signals and outputting from a first adjust output end a delay adjust signal to said input end of said first cascade adder of said clock counter and from a second adjsut output end an exceed adjust signal to said input end of said second cascade adder of said clock counter, forming a feedback, adjustment, and control of signals.

* * * * *